Jan. 20, 1931.  W. N. HERRICK  1,789,309
PASTING MACHINE
Filed Sept. 29, 1928
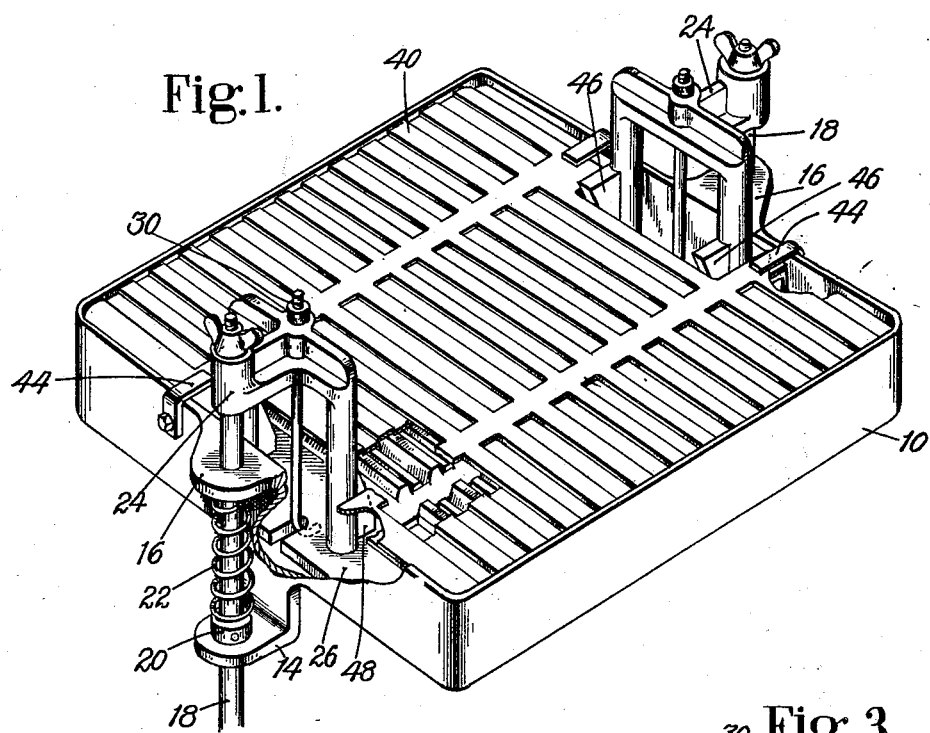
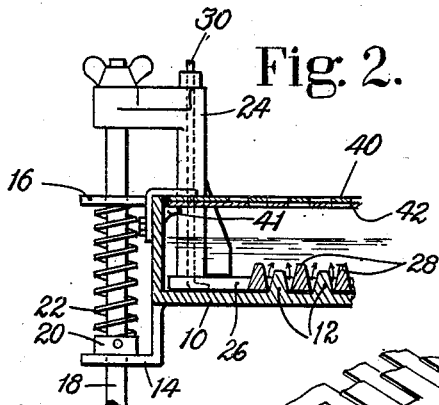
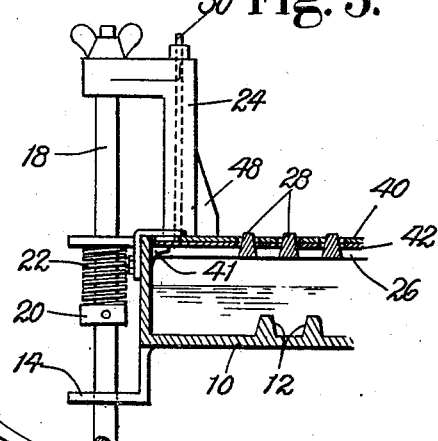
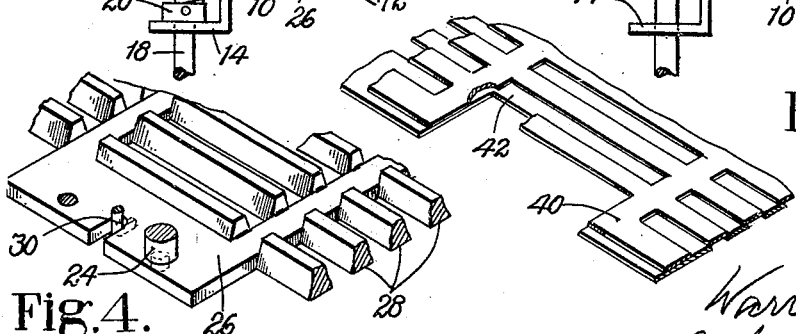
INVENTOR
Warren N. Herrick
By his Attorney
Nelson W. Howard Patented Jan. 20, 1931

1,789,309

UNITED STATES PATENT OFFICE

WARREN N. HERRICK, OF HAVERHILL, MASSACHUSETTS, ASSIGNOR TO UNITED SHOE MACHINERY CORPORATION, OF PATERSON, NEW JERSEY, A CORPORATION OF NEW JERSEY

PASTING MACHINE

Application filed September 29, 1928. Serial No. 309,195.

This invention relates to pasting machines adapted for use in those arts in which it is desired to apply paste smoothly and in a uniformly distributed manner over considerable areas of material as, for example, in the manufacture of boots and shoes, paper boxes and the like.

The invention is herein shown as embodied in a pasting machine employing a grid arranged to be raised and lowered in a receptacle containing liquid paste. The grid is thus alternately immersed to receive paste upon its paste-applying surfaces and elevated so that the material to be pasted may be laid upon the surface of the grid and receive a coating of paste in a series of lines or spots according to the formation of the grid.

It is important in the continued use of pasting machines to subject the paste to a thorough agitation as otherwise the solid ingredients of the paste tend to settle to the bottom of the receptacle, changing the composition of the paste and tending to clog the machine. With these conditions in view, my invention contemplates as an important feature a receptacle for paste having valleys formed in the bottom thereof and an agitating device with portions conforming substantially in contour or plan to the outline of the valleys and being movable in the body of the paste in the receptacle into and out of the valleys. It will be seen that the action of such an agitator in entering the lowermost part of the paste receptacle is to displace the paste from the very bottom of the paste body and from the location where the tendency to settle out is most pronounced. In this way, a complete agitation of the paste is insured regardless of the level of the paste in the receptacle.

In accordance with another feature of the invention, I propose to utilize the paste-applying grid as an agitating device and, accordingly, the grid is made of such conformation as to enter and substantially fill the valleys in the bottom of the paste receptacle. This arrangement presents the further advantage of utilizing fully all the paste in the receptacle even when the amount of paste is reduced to a low level in that, when the grid occupies the valleys in the bottom of the receptacle, the residuum paste is displaced by the grid and transferred directly to its paste-applying surfaces.

As herein shown, the valleys are formed in the bottom of the paste receptacle between a series of integral ribs. Such construction is advantageous from the manufacturing standpoint particularly where it is desired to employ a grid having parallel ribs with laterally separated paste-applying surfaces. Accordingly, another important feature of my invention consists in a paste receptacle having projecting ribs in its bottom and a past-applying grid having a corresponding series of ribs and being movable in the receptacle to carry the ribs of the grid into and out of the spaces between the ribs in the receptacle bottom.

It is desirable to prevent undue evaporation of the paste as this tends to change its composition and encrust the parts of the pasting machine, interfering with their operation and with the cleanliness of the apparatus. With these conditions in view, another feature of the invention consists in a receptacle for paste having a cover slidable laterally and constructed and arranged to be automatically opened when the grid is elevated from the paste its paste-applying portions may be presented in position above the cover and closed as the grid is lowered. While such a cover constitutes a feature of my invention, I propose to carry this idea further and provide complementary cover sections, one movable with respect to the other, and so arranged that the descending movement of the grid displaces one cover section with respect to the other, so as completely to seal the paste receptacle while, on the other hand, when the grid is elevated to its paste-applying position the sections are again displaced so that openings corresponding to the paste-applying portions of the grid are effective to permit the passage thereof.

These and other features of the invention will be best understood and appreciated from the following description of a preferred embodiment thereof, selected for purposes of illustration and shown in the accompanying drawings, in which Fig. 1 is a view in perspective of the machine with a portion of the paste pan broken away;

Fig. 2 is a fragmentary sectional view showing the grid in its lowered position;

Fig. 3 is a similar view showing the grid in its elevated position;

Fig. 4 is a view in perspective of a portion of the grid; and

Fig. 5 is a view in perspective of a portion of the cover.

The invention is herein disclosed as embodied in a pasting machine intended particularly for applying paste to the linings and other portions of shoes. A machine of this general type is disclosed in U. S. Letters Patent No. 1,467,343, granted September 11, 1923, on an application of C. B. Tibbetts, to which reference may be had for details of construction not herein shown.

The paste receptacle comprises a shallow rectangular pan 10 which may be cast of aluminum or other material adapted to withstand corrosion. In the bottom of the pan 10 are provided a series of integral projecting ribs 12 of uniform height and spacing and parallel arrangement. Except for the ribs 12, the bottom of the paste pan 10 is substantially flat and, accordingly, the spaces between the ribs and between the ribs and the walls of the paste pan constitute valleys which will contain the residuum of the paste when the level thereof is reduced in the use of the machine, and into which the solid ingredients of the paste will tend to settle if the paste in the pan is not occasionally agitated. The exact configuration of the ribs is not important except that it should correspond to the shape of the particular grid which it is desired to employ. As herein shown, the ribs of the grid are not continuous but are interrupted by laterally extending frame members and, accordingly, the ribs 12 will be correspondingly interrupted.

The grid, which has the functions of an agitating device and also of a paste-applying member, comprises a flat plate or frame 26 having a series of parallel ribs 28 secured to or cast integral with it. The grid fits within the paste pan 10 having sufficient clearance to permit free movement. The ribs 28 are spaced to correspond with the ribs 12 of the paste pan but are arranged in staggered relation therewith so that when the grid is lowered the ribs 28 occupy the valleys between the ribs 12. The ribs 28, like the ribs 12, are tapered upwardly and their flat upper surfaces constitute a series of elongated paste-applying surfaces to which paste is delivered when the grid is immersed, and on which the paste remains when the grid is elevated. The material to be pasted is laid upon these paste-applying surfaces of the grid while the latter is held in elevated position and the paste applied in this manner. The plate or frame 26 of the grid is flush with the lower surface of the ribs 28 and shaped to contact with the bottom of the paste pan 10 when the grid is lowered and to clear the ribs 12. The grid is shown in its lowermost position in Fig. 2, from which it will be apparent that the ribs 28 of the grid substantially fill the valleys between the ribs 12 of the paste pan and displace most of the paste retained therein, causing it to flow upwardly toward the upper surface of the grid.

The paste pan 10 is provided at each end with a pair of outwardly extending ears 14 and 16 which are perforated and serve as guides for a pair of vertically moving rods 18. At its upper end each rod is secured to a bracket member 24 having a lateral extension and two downwardly extending arms which are doweled into the ends of the grid frame 26. A hooked clamping rod 30 engages a slot in the lower side of the grid frame and extends upwardly through the bracket 24, being threaded at its upper end to receive a clamping nut. A compression spring 22 surrounds each rod 18 beneath the ear 16 of the paste pan and acts upon a collar 20 secured to the rod so that it tends at all times to move the rod downwardly and carry the grid to its lowermost position. The rods 18 are connected at their lower end to a treadle such as that shown in the patent above referred to or to any other suitable mechanism for simultaneously lifting the rods and maintaining the grid in its elevated paste-applying position. The connection above described of the bracket 24 with the grid constitutes a convenient quickly-detachable connection permitting removal of the grid for purposes of cleaning and ready replacement thereof.

The paste pan 10 is provided with a cover comprising two corresponding perforated sections 40 and 42. The lower section 42 rests upon brackets 41 which project from the inner walls of the paste pan. This section is stationary and provided with slots similar in shape and location to the ribs 28 of the grid but slightly wider so that when the grid is elevated the ribs 28 may pass through the slots of the cover section without having the paste scraped off. The upper cover section 40 is similar in shape and the arrangement of its slots to the lower section 42 but is arranged to be moved thereon so that its slots may either register with the slots of the lower cover section, making the openings fully effective, or so as completely to close the openings. It will be apparent that a cover with openings which are the complement of the projecting paste-applying portions of the grid will serve to reduce evaporation of the paste within the pan and at the same time permit the movement of the grid into its operative paste-applying position.

In order to close the cover automatically when the grid is lowered and open it automatically when the grid is elevated, a pair of wedge-shaped members 46 with inclined cam faces are mounted upon the right-hand bracket 24 and a complementary pair of wedge-shaped members 48 with oppositely inclined cam surfaces are mounted on the left-hand bracket 24. These cam members engage opposite sides of the movable cover section 40 and act to shift it back and forth as the grid is raised or lowered. The cover section 40, therefore, is positively controlled at all times and is shifted from its open position, as shown in Fig. 3, toward the left as the grid is moved downwardly by the action of the cam members 46. The cover is shown in closed condition in Fig. 2. It will be apparent that when the grid is elevated and the cam members 48 are moved upwardly, the cover section 40 will be shifted toward the right and the slots in the two cover sections brought into registration again. The inclined surface of all the cam members terminates in a straight portion which permit further vertical movement of the grid after the cover section has been completely shifted in either direction.

The cover as a whole is retained in place by angle pieces 44 which are secured to the sides of the paste pan and extend over the top of the cover. These not only hold the cover in place but act through the cover to positively limit the upward movement of the grid. In dismantling the machine for cleaning purposes, the angle pieces 44 are first disengaged, thus releasing the cover, and then the grid may be disconnected from the brackets by loosening the clamping rods 30.

The operation of the machine will be clear from the foregoing description. Each time the grid is lowered it is plunged into the liquid paste in the pan, agitating it completely to the lower portion thereof which occupies the valleys between the ribs 12 in the bottom of the pan. While the grid occupies its lower position and while the machine is unattended, the cover is completely closed and evaporation of the paste prevented. The downward movement of the grid not only agitates the paste but causes it to be displaced upwardly so that a minimum amount of paste in the pan is effective to reach the upper paste-applying surfaces of the ribs of the grid. When the grid is elevated, the cover is automatically opened in advance of the grid so that its ribs are free to pass through the cover and assume paste-applying position.

The machine herein disclosed has been referred to as a pasting machine and the contents of the receptacle as paste but it will be understood that this is for convenience in expression only and that the use of the machine as a coating apparatus of general application is contemplated and the term "paste" is used generically as including cement, glue or other adhesive.

Having thus described my invention, what I claim as new and desire to secure by Letters Patent is:

1. In a pasting machine, a receptacle for paste having valleys formed in the bottom thereof, and an agitating device with portions conforming substantially in contour to the outline of said valleys and being movable in the body of paste in the receptacle into and out of the valleys.

2. In a pasting machine, a receptacle for paste having elongated shallow valleys formed in the bottom thereof, and an agitating device having elongated portions conforming substantially in contour to the contour of said valleys and being movable in the body of paste in the receptacle to carry said elongated portions into and out of the valleys.

3. In a pasting machine, a receptacle for paste having ribs separated by valleys in its bottom, and an agitating device having cut-out portions corresponding substantially in contour to said ribs, whereby it may rest on the bottom of the receptacle in the valleys between the ribs and displace the paste therefrom.

4. In a pasting machine, a receptacle for paste having ribs separated by spaces in its bottom, a ribbed paste-applying grid movable in the receptacle and shaped in contour to occupy substantially all the space between the ribs of the bottom when in its lowered position, thereby to displace paste from the bottom of the receptacle and cause it to cover the upper surface of the grid.

5. In a pasting machine, a receptacle for paste having a bottom with parallel projecting ribs of uniform height, and a paste-applying grid having a corresponding series of ribs and movable in said receptacle to carry the ribs of the grid into and out of the spaces between the ribs of the receptacle bottom, thereby to agitate the paste completely and to transfer it to the upper surface of the grid.

6. In a pasting machine, a paste pan having a series of integral ribs projecting from its bottom, a paste-applying grid shaped to fill substantially all the space between said ribs and having open spaces corresponding to said ribs and a series of upwardly projecting ribs with paste-applying surfaces, means for normally maintaining said grid upon the bottom of the pan, and connections whereby the grid may be elevated through the paste in the pan.

7. In a pasting machine, a receptacle for paste, a grid movable in the receptacle and having projecting portions with paste-applying surfaces, a slidably mounted cover member, and a cam secured to said grid coacting with said cover member to displace the same as the grid is raised, whereby the grid may be raised to present its paste-applying surfaces in exposed position above the level of the cover.

8. In a pasting machine, a receptacle for paste, a grid movable in the receptacle and having elongated upwardly projecting portions with paste-applying surfaces, a normally stationary cover member having complementary cut-out portions through which the projecting portions of the grid are exposed when the latter is elevated, and an auxiliary cover member slidable horizontally to uncover the cutout portions of the stationary cover member.

9. In a pasting machine, a receptacle for paste, a grid movable in the receptacle from an immersed paste-receiving position to an elevated paste-applying position, and a slidably mounted cover member for said receptacle arranged to be automatically moved horizontally to expose the grid when the grid is moved into its elevated position.

10. In a pasting machine, a receptacle for paste, a grid movable in the receptacle from an immersed paste-receiving position to an elevated paste-applying position, and a slidably mounted cover arranged to be automatically closed by lateral movement when the grid is lowered toward its immersed position.

11. In a pasting machine, a receptacle for paste, a grid movable in the receptacle from an immersed paste-receiving position to an elevated paste-applying position, and a cover comprising complementary sections arranged to be relatively displaced by the movement of the grid.

12. In a pasting machine, a receptacle for paste, a grid movable in said receptacle from an immersed paste-receiving position to an elevated paste-applying position, a cover having openings corresponding in outline to portions of the grid, and means movable automatically to close said openings when the grid is lowered and to open them when the grid is elevated.

13. In a pasting machine, a receptacle for paste, a grid movable in said receptacle and having an inclined cam surface, a cover section having openings corresponding in outline to portions of the grid, and a similar cover section arranged to be shifted laterally by the inclined cam surface of the grid when the latter is lowered thereby closing the openings in the cover.

14. In a pasting machine, a receptacle for paste, a grid movable in said receptacle and having complementary inclined cam surfaces, and complementary cover sections with openings corresponding in outline to portions of the grid, one of which is arranged to be shifted back and forth to open and close the cover to expose or cover the grid according as the latter is elevated or lowered.

15. In a pasting machine, a paste pan having a series of projecting ribs in its bottom, a grid including a similar series of ribs located in staggered relation to the ribs in said bottom and a cover having a series of slots also located in staggered relation to the ribs of said bottom.

16. In a pasting machine, a paste receptacle, a grid having projecting portions with paste-applying surfaces and being movable in said receptacle, a cover for said receptacle having openings corresponding in shape to the projecting portions of the grid, and means normally closing said openings arranged to be displaced in advance of the grid as it approaches said cover.

In testimony whereof I have signed my name to this specification.

WARREN N. HERRICK.